(12) United States Patent
Blanchard (10) Patent No.: US 7,071,927 B2
(45) Date of Patent: *Jul. 4, 2006

(54) RESISTIVE TOUCH PANEL USING REMOVABLE, TENSIONED TOP LAYER

(75) Inventor: Randall D. Blanchard, San Diego, CA (US)

(73) Assignee: L-3 Communications Corporation, San Carlos, CA (US)

( * ) Notice: Subject to any disclaimer, the term of this patent is extended or adjusted under 35 U.S.C. 154(b) by 476 days.

This patent is subject to a terminal disclaimer.

(21) Appl. No.: 10/639,280

(22) Filed: Aug. 12, 2003

(65) Prior Publication Data

US 2004/0095332 A1    May 20, 2004

Related U.S. Application Data

(62) Division of application No. 09/442,227, filed on Nov. 17, 1999, now Pat. No. 6,664,950.

(51) Int. Cl.
*G09G 5/00* (2006.01)

(52) U.S. Cl. .................. 345/173; 178/18.01; 178/18.1

(58) Field of Classification Search ........ 345/173–179; 178/18.01, 18.1, 19.01
See application file for complete search history.

(56) References Cited

U.S. PATENT DOCUMENTS

| 4,243,879 A | 1/1981 | Carroll et al. ............... 250/221 |
| 4,289,925 A | 9/1981 | Lambden ...................... 178/18 |
| 4,737,633 A | 4/1988 | Sasaki et al. ................ 250/221 |
| 4,739,160 A | 4/1988 | Kawabe et al. ............. 250/221 |
| 4,751,379 A | 6/1988 | Sasaki et al. ............... 250/221 |
| 4,771,170 A | 9/1988 | Hasegawa .................... 250/221 |
| 4,774,404 A | 9/1988 | Hasegawa et al. .......... 250/221 |
| 4,855,590 A | 8/1989 | Bures et al. ................. 250/221 |
| 5,159,323 A | 10/1992 | Mase et al. ................. 340/712 |
| 5,515,083 A | 5/1996 | Casebolt et al. ............ 345/175 |
| 5,550,564 A | 8/1996 | Cragun ........................ 345/173 |
| 5,561,541 A | 10/1996 | Sharp et al. .................. 359/66 |
| 5,594,470 A | 1/1997 | Meyerson et al. .......... 345/169 |
| 5,604,517 A | 2/1997 | Filo ........................... 345/173 |

(Continued)

*Primary Examiner*—Xiao Wu (57) ABSTRACT

Sunlight can damage a conventional touch screen display and cause the display to be quite difficult to read. Furthermore, conventional touch screen displays are easily damaged, and, once damaged, the entire touch screen is replaced. To address these concerns, a touch panel includes anti-reflective coatings on the surfaces of the top plate and the base plate that are open to the air. These coatings substantially reduce reflections and make the touch screen easier to read in direct sunlight. In particular, the anti-reflective coating used on the upper surface of the base plate is dielectric in nature to reduce reflectivity even further. This dielectric coating includes openings to an underlying conductive layer so that an electrical contact is made when a user deflects the top plate into the base plate. Also, the top plate may be detachably coupled to the base plate, advantageously by double stick adhesive tape, so that only the top plate is replaced when damaged. In one embodiment, the top plate is placed in tension within a frame to prevent wrinkling. Furthermore, a resistive voltage divider may be fabricated on the base plate. The resistive voltage divider may include a substantially continuous strip of resistive material disposed on the conductive layer of the base plate, and a plurality of conductive traces disposed on the dielectric layer of the base plate and coupled to the resistive material in selected locations.

30 Claims, 5 Drawing Sheets

U.S. PATENT DOCUMENTS

| | | | |
|---|---|---|---|
| 5,633,660 A | 5/1997 | Hansen et al. | 345/173 |
| 5,668,353 A | 9/1997 | Matsuda et al. | 178/18 |
| 5,668,576 A | 9/1997 | Ikura et al. | 345/173 |
| 5,729,250 A | 3/1998 | Bishop et al. | 345/175 |
| 5,831,600 A | 11/1998 | Inoue et al. | 345/173 |
| 5,942,733 A | 8/1999 | Allen et al. | 178/18.01 |
| 6,078,274 A | 6/2000 | Inou | 341/34 |
| 6,166,855 A | 12/2000 | Ikeyama et al. | 359/580 |
| 6,512,512 B1 | 1/2003 | Blanchard | 345/173 |

RESISTIVE TOUCH PANEL USING REMOVABLE, TENSIONED TOP LAYER

This is a divisional of application Ser. No. 09/442,227 filed on Nov. 17, 1999 now U.S. Pat. No. 6,664,950.

BACKGROUND OF THE INVENTION

1. Field of the Invention

The present invention relates generally to input devices and, more particularly, to improvements for touch panel displays.

2. Background of the Related Art

This section is intended to introduce the reader to various aspects of art that may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Input devices perform the function of providing some means for entering commands and data into a computer, data processor, or information system. A variety of input devices are currently available, including keyboards, light pens, data tablets, mice, track balls, joysticks, scanners, voice recognition devices, and touch screens. Each of these input devices exhibits various advantages and disadvantages, and the input device or devices used in any particular application are typically chosen to maximize the efficient input of information into the system.

This disclosure is primarily directed to the last of the input devices mentioned above, namely touch screens. Unlike the other input devices mentioned above, touch screens not only act as a data input device, they also act as a display unit. Essentially, a touch screen is a display unit with some form of a touch-sensitive surface. Due to this unique characteristic, touch screens are currently utilized in a variety of different applications, such as computer terminals, cash registers, automatic teller machines, and automated gasoline pumps to name just a few.

Currently, there are at least four different technologies used for touch screens: (1) capacitive; (2) resistive, (3) surface acoustic wave, and (4) light beam interruption. Although each of these different types of touch screens operate in a different manner and exhibit certain advantages and disadvantages, certain similarities exist. For example, regardless of the type of touch screen, the touch screen system typically includes a sensor unit, which senses the location touched on the display, and a controller unit, which interfaces with the sensor unit and communicates the location information to a system computer. Thus, regardless of the technology employed, each type of touch screen performs the same general function.

However, it is the differences in the way that the various types of touch screens operate that causes a designer to use one type of touch screen over another for a particular application. Resistive touch screens, for example, advantageously exhibit low cost, high touch point density, and can be operated with a gloved hand. Disadvantageously, however, resistive touch screens can be easily damaged and exhibit poor display characteristics (particularly in sunlight). Capacitive touch screens also provide high touch point density and low cost, but capacitive touch screens can be easily damaged, must be calibrated due to large temperature changes, and cannot be operated with a gloved hand.

In contrast, surface acoustic wave touch screens have no overlay to be damaged or to reduce the visual quality of the display. However, surface acoustic wave touch screens typically exhibit the highest cost and can be falsely triggered by noise, wind, transmission signals, and insects. Touch screens that use light beam interruption, typically called infrared touch screens, are relatively expensive. Advantageously however, they have no touch sensitive overlay to be damaged, exhibit high touch point density, can be operated with heavy gloves, exhibit good immunity to most false trigger sources, and are extremely rugged and weather sealable. Although these advantages typically make infrared touch screens the most suitable type of touch screen to use in outdoor applications, high ambient light conditions, such as direct sunlight, can cause an infrared touch screen to malfunction.

It can be seen that each type of touch screen exhibits some disadvantage which makes it not well suited for outdoor use, particularly in high ambient light conditions. Of the different types of touch screens mentioned above, resistive touch screens typically offer the lowest cost along with very good operational performance. In a resistive touch screen, a display, such as a liquid crystal display, resides beneath a multi-layered screen overlay. The top layer touched by a user is a plastic layer with a transparent metallic film on its underside. This top layer is separated by insulating spacers from a bottom layer that has a metallic film on its upper side. These metallic films face one another so that the films make contact when a user presses the top layer into contact with the bottom layer. A conductive path is formed at the point of contact. Thus, the films act as a voltage divider, and the voltage at the point of contact may be measured in the X and Y directions by applying the voltage in one direction and then the other direction. The measured voltages may then be sent to a controller where they are converted into coordinates on the screen and sent to a computer.

This overlay screen suffers in outdoor applications, and particularly in sunlight, for various reasons. First, the typical reflectance of such overlay screens is about 25%, making the underlying display difficult to read. Second, such overlay screens allow most of the infrared radiation from sunlight to be absorbed by the underlying liquid crystal display, and this radiation can cause solar thermal loading of the display which lead to display malfunction. Third, the materials used for such overlay screens tend to deteriorate rapidly from exposure to the ultraviolet rays of the sun. Fourth, the top layer touched by users is easily scratched or damaged, thus requiring the whole touch panel to be replaced.

The present invention may address one or more of the problems set forth above.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is provided a touch panel display system that includes a computer, a controller coupled to the computer, and a display screen coupled to the computer. A touch panel is coupled to the controller and disposed over the display screen. The touch panel includes a base plate being disposed adjacent the display screen. The base plate has a rigid substrate having an upper surface and a lower surface. A first conductive layer is disposed over the upper surface of the rigid substrate. An anti-reflective dielectric layer is disposed over the first conductive layer, and the anti-reflective dielectric layer has openings through to the first conductive layer. A first anti-reflective layer is disposed on the lower surface of the rigid substrate. A top plate is disposed in spaced apart relation over the base plate. The top plate has a flexible substrate having an upper surface and a lower surface. A hard coating layer, a second anti-reflective layer, and a tensioning frame are disposed over the upper surface of the flexible substrate, and an anti-reflective conductive layer is disposed on the lower surface of the flexible substrate.

In accordance with another aspect of the present invention, there is provided a touch screen overlay that includes a tensioning frame. A flexible substrate having an upper surface and a lower surface is coupled to the tensioning frame. Double stick adhesive tape is coupled to the lower surface of the flexible substrate.

In accordance with still another aspect of the present invention, there is provided a touch screen that includes a top plate having an upper surface and a lower surface and a base plate having an upper surface and a lower surface. A tensioning frame is coupled to the upper surface of the top plate. A member detachably couples the lower surface of the top plate to the upper surface of the base plate.

In accordance with yet another aspect of the present invention, there is provided a method of bonding a frame to a touch panel. The method involves heating the touch panel to a temperature greater than the operating temperature of the touch panel. After heating the touch panel, the frame is attached to the perimeter of the touch panel. As the touch panel assembly is cooled to room temperature, the touch panel is in tension.

In accordance with a yet further aspect of the present invention, there is provided a sensing unit for a touch panel. A first plate of the touch panel has a first layer of conductive material disposed on its surface. A second plate of the touch panel has a second layer of conductive material disposed on its surface and has a layer of dielectric material disposed over the second layer of conductive material such that a peripheral portion of the second layer of conductive material remains exposed. The layer of dielectric material has openings through to the second layer of conductive material. A substantially continuous resistive member is disposed over the exposed peripheral portion of the second layer of conductive material adjacent a periphery of the layer of dielectric material. A plurality of conductive traces is disposed on the layer of dielectric material, where each of the plurality of conductive traces has a first end coupled to a respective selected location of the resistive member.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
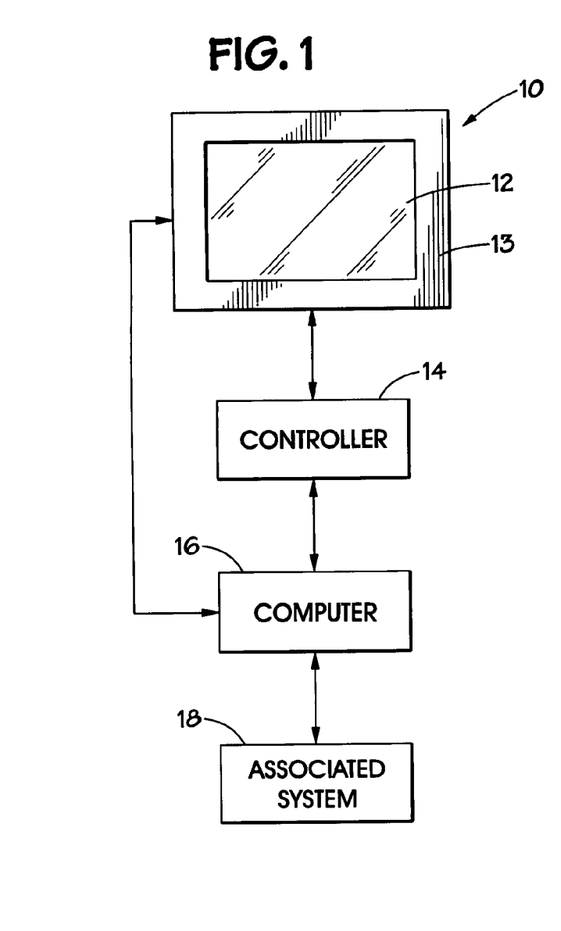
FIG. 1 illustrates a simplified schematic diagram of a display system.

Turning now to the drawings, and referring initially to FIG. 1, a touch screen display system is illustrated and generally designated by a reference numeral 10. The touch screen display system 10 includes a touch screen and display assembly 12. The touch screen is mounted in front of the display, such as a liquid crystal display or a cathode ray tube, so that information on the display may be read through the touch screen. Advantageously, a face plate 13 is coupled to the assembly 12 in a manner which seals and protects the assembly 12 from damage, such as damage caused by impacts or weather. It should also be noted that the face plate 13 defines the periphery of an opening in which the assembly 12 resides that allows a user to contact the touch panel overlying the display.

A controller 14 is electrically coupled to the touch screen of the assembly 12. The controller 14 may be mounted on the assembly 12, or it may be mounted in a separate location. When a user inputs data into the system. 10 by touching a portion of the touch screen overlying selected indicia on the display, the controller 14 receives information from the touch screen related to the user inputs and converts this information to coordinate data. The coordinate data is delivered to a computer 16 that is electrically coupled to the controller 14. The computer 16 is also electrically coupled to the display of the assembly 12 and, typically, to an associated system 18 that the system 10 controls. The computer 16 determines which displayed indicia corresponds to the coordinate data, and it controls the display and the associated system 18 accordingly.

As discussed previously, resistive touch panels have been historically disadvantaged because they can be easily damaged and because they exhibit poor display characteristics, particularly in high ambient light conditions. Also, once a typical touch panel is damaged, the entire touch panel usually must be replaced. These problems and others are addressed by the touch panel and display assembly illustrated in FIGS. 2, 3, 4 and 6, which includes a touch panel and a display screen 22.

Figure 2:
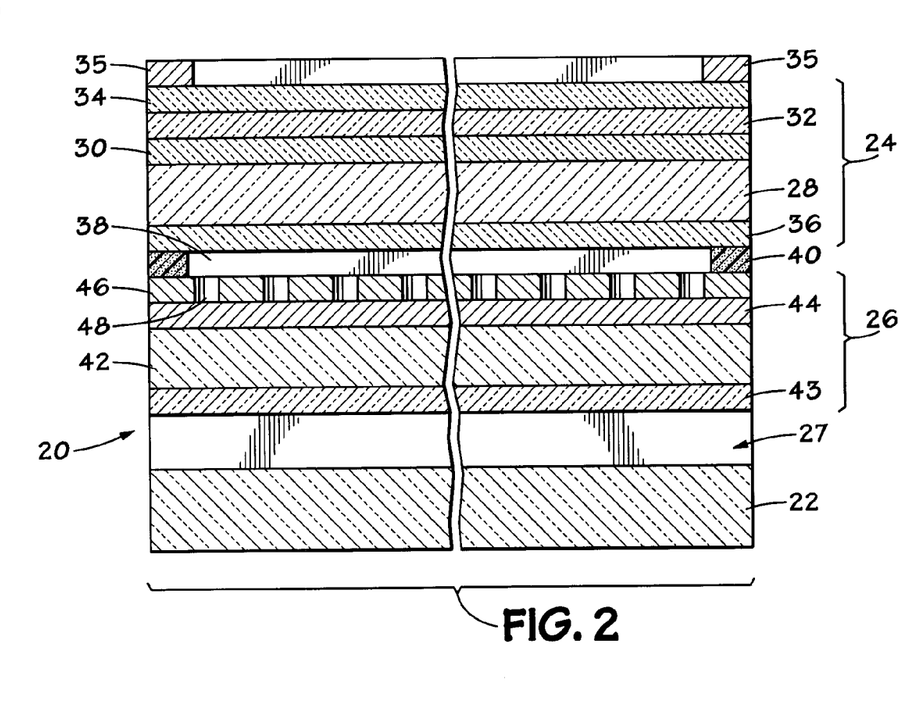
FIG. 2 illustrates a cross-sectional view of a touch screen display in accordance with the present invention.

The touch panel 20 includes a top plate 24 and a base plate 26. As illustrated in FIG. 2, the touch panel 20 may be situated relative to the display screen 22 such that an air gap 27 exists between the base plate 26 and the display screen 22. This arrangement facilitates the cooling of the display screen 22 as air may circulate about it.

The primary structural component of the top plate 24 is a substrate 28. The substrate 28 is advantageously selected to be a durable, flexible, and transparent material, since it is intended for use as a deflecting element which moves into contact with the base plate 26 when pushed by a user. Suitable materials may include Mylar, Lexan, and CR-39, for example. The thickness of the substrate 28 should advantageously allow deflection into the base plate 26 with light finger pressure, while not becoming wavy at high temperature. Advantageously, it should also be stiff enough so as not to make contact with the base plate 26 unless pressed. The thickness of the substrate 28 may be in the range from about 5 to about 20 mils, for example.

To enhance the damage resistance of the top plate 24, the substrate 28 is coated with a hard transparent coating 30. Although the individual needs of particular applications may be taken into account when selecting the material for the hard coating 30, the material should advantageously be one that will wear well when subjected to the abuse of the general public. Such abuse may not only include general wear and tear from normal operation of the touch panel 20, but may also include vandalistic abuse such as being struck with rocks, poked with sticks, cut by knives, or burned by lighters. While it is unlikely that any material would adequately protect the top plate 24 from all such abuses, it is generally advisable that the hard coating 30 be selected from the most durable material that falls within the technical and financial constraints of a particular application. Suitable materials may include, for instance, silicon dioxide.

The optical qualities of the top plate 24 are enhanced by the use of one or more anti-reflective coatings 32 which may be placed over the hard coating 30. An anti-reflective coating is advantageously index matched to the substrate 28 to provide low levels of reflectivity, advantageously in the range of 0.25 to 1.00%. In addition to enhancing the reflection properties of the top plate 24, the coatings 32 also advantageously include a "hot mirror" capability to reflect solar energy outside the visible spectrum, i.e., infrared and ultraviolet light, to protect the underlying elements of the touch screen 20 and the display 22 from damage. Suitable anti-reflective materials may include silicon dioxide or magnesium fluoride.

To improve the optical characteristics of the top plate 24 further, an anti-fingerprint coating 34 may be applied as the outer surface of the top plate 24. The anti-fingerprint coating 34 may be a commercially available coating that is resistant to dirt and oils, i.e., hydrophobic, so that fingers and dirty gloves will not smudge the top plate 24.

Referring again to FIG. 2, the underside of the substrate 28 is spaced from the upper surface of the base plate 26 by an air gap 38. This surface of the substrate 28 is coated with an anti-reflective conductive material 36. As described below in greater detail, it is the conductive material 36 which makes contact with a conductive layer on the base plate 26 when a user presses the top plate 24 and deflects it across the air gap 38. The anti-reflective nature of the conductive material 36 further improves the optical qualities of the top plate 24, and the conductive layer 36 is advantageously indexed matched to the substrate 28 to reduce reflection. The conductive layer 36 may be made of titanium or indium tin oxide (ITO), for example.

To prevent wrinkling of top plate 24 as it expands due to temperature variations, a stiff frame 35 may be bonded to the anti-fingerprint coating 34. As described below, the process by which the frame 35 is attached will maintain the film surface tension despite temperature changes. Alternatively, if an anti-fingerprint coating 34 is not applied as the outer surface of the top plate 24, the stiff frame 35 may be bonded to whatever layer comprises the outer surface of top plate 24.

Figure 3:
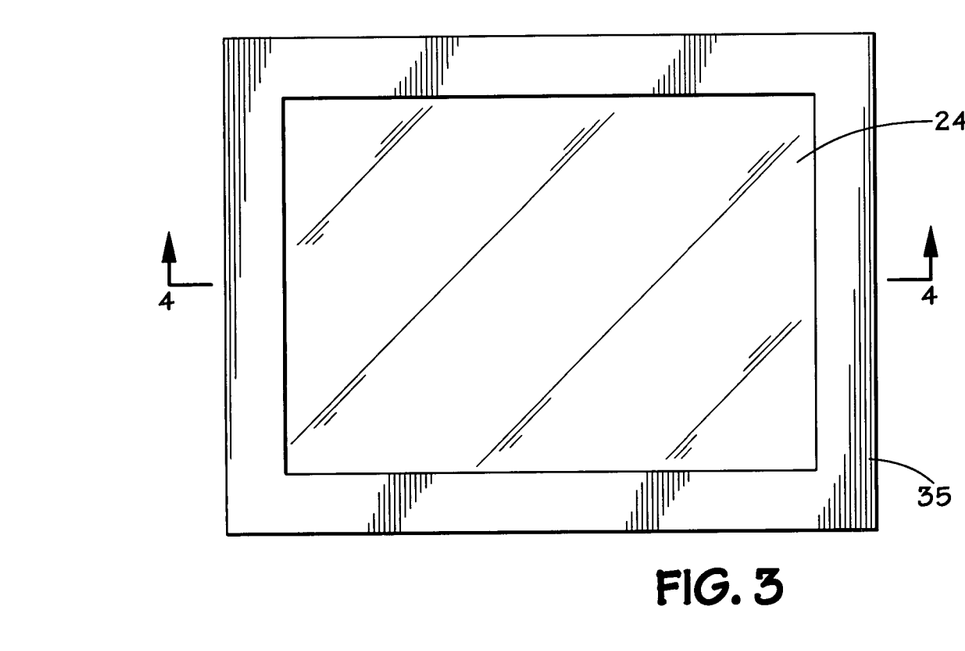
FIG. 3 illustrates a frontal view of a replaceable panel of a touch screen display.

As depicted in FIG. 3, the stiff frame 35 is bonded directly to the outer surface of top plate 24 and is located about the perimeter of the touch screen. In one embodiment, the frame 35 could be made of a metal sheet such as aluminum or stainless steel. It should be appreciated however, that other materials could be used to make the frame 35. For example, an alternate embodiment could use a frame material with an equal or higher coefficient of thermal expansion than the film material, such as a reinforced plastic sheet or structural bezel.

Figure 4:
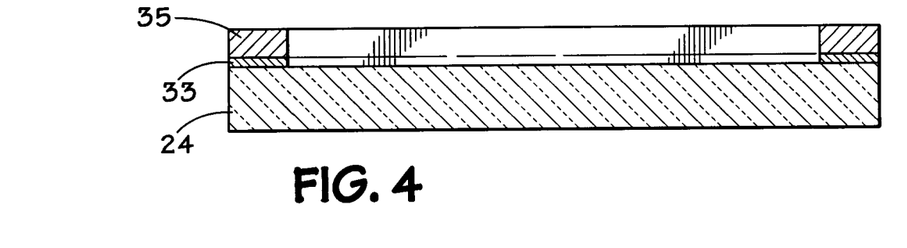
FIG. 4 illustrates a cross-sectional view taken along line 4—4 of FIG. 3.

The top plate 24 may be tensioned to a smooth condition in a fixture (not shown) and then bonded to the frame 35. The frame 35 then maintains the top plate 24 in a relatively consistent tension despite temperature changes. FIG. 4 illustrates a cross-sectional view of a stiff frame 35 bonded to the top plate 24 by an adhesive 33. In one embodiment, adhesive 33 is an ultraviolet (UV) curing adhesive, but any suitable adhesive or mounting means may be used.

Figure 5:
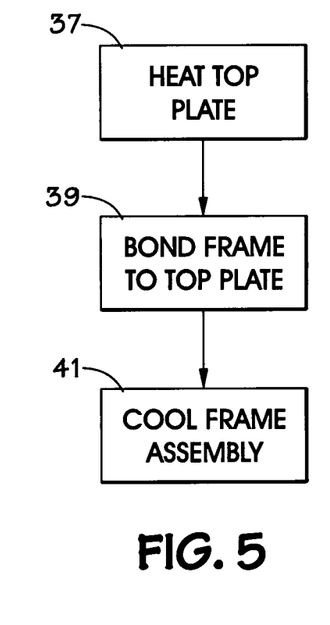
FIG. 5 illustrates a simplified process flow making the replaceable panel of FIGS. 3 and 4.

FIG. 5 illustrates an advantageous process for bonding the frame 35 to the top plate 24. The first step involves heating the top plate 24 to a temperature above which would be encountered during normal use. (Block 37). For example, the top plate 24 may be heated to 60° C.–100° C. Next, the frame 35 is bonded to the top plate 24 using an adhesive 33, such as an UV curing adhesive. (Block 39). As the frame assembly cools, the top plate 24 will be placed in tension at all temperatures below the mounting temperature. (Block 41).

Referring again to FIG. 2, the top plate 24 may be fixed to the base plate 26 in a spaced apart relationship in a conventional manner. However, in this embodiment, the top plate 24 is advantageously spaced from the base plate 26 in a manner than allows the top plate 24 to be removed from the base plate 26 so that the top plate 24 may be separately replaced if damaged.

Figure 6:
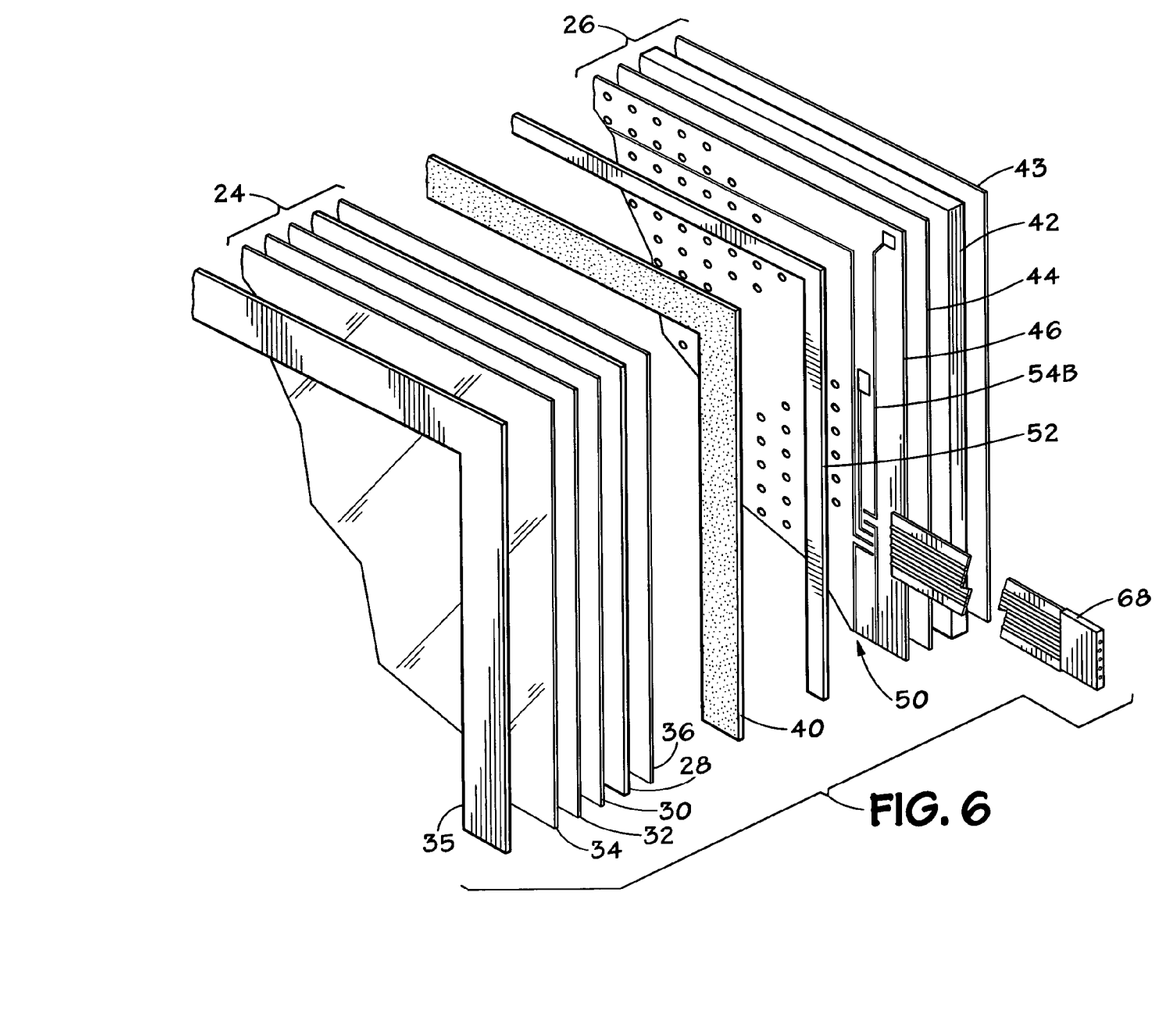
FIG. 6 illustrates a partial exploded view of the touch screen display illustrated in FIG. 2.

One particularly cost effective arrangement is the use of a strip of double stick adhesive tape 40 that is applied about a peripheral portion of the touch panel between the top plate 24 and the base plate 26, as best illustrated in FIG. 6. An advantageous type of double stick adhesive tape 40 is a high tack/low tack Scotch brand adhesive tape available from 3M. This tape features a carrier having a strong adhesive on one side and a repositionable adhesive on the other side. Because the adhesive properties of such tape may degrade with repeated use, it may be desirable to place the high tack side of the adhesive tape 40 on the top plate 24. In this situation, the tape 40 is retained on the top plate 24 when a damaged top plate is removed, and a new piece of tape will be affixed to the replacement top plate. However, as described below, a resistive voltage divider circuit may be fabricated on a peripheral portion of the base plate 26. Thus, it may be desirable to provide additional protection for this circuit by placing the high tack side of the adhesive tape 40 on the base plate 26 to cover this circuit so that the tape 40 remains on the base plate 26 when a damaged top plate 24 is removed and replaced.

Although not specifically illustrated, other techniques may also be used to mount the top plate 24 in a removable fashion over the base plate 26. For instance, spacers may be provided between the top plate 24 and the base plate 26, and the top plate 24 may be bolted to the base plate 26. As another alternative, spacers and/or spacer dots may be provided between the top plate 24 and the base plate 26, and a removable bezel arrangement, or the like, may be used to clamp or similarly hold the top plate 24 to the base plate 26.

Figure 7:
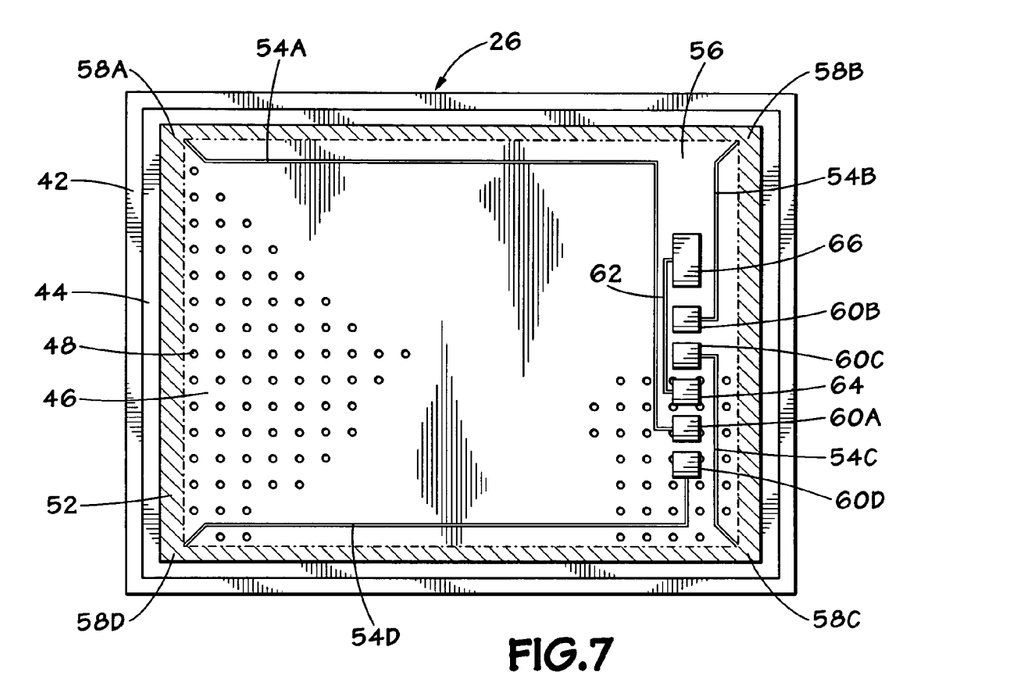
FIG. 7 illustrates a base plate having a resistive voltage divider circuit in accordance with the present invention.

Referring to FIGS. 6 and 7, the primary structural component of the base plate 26 is a transparent substrate 42. The substrate 42 is advantageously selected to be relatively rigid compared to the relatively flexible substrate 28 of the top plate 24, since it is intended to limit deflection of the top plate 24 in order to provide an accurate indication of the location on the screen selected by the user. Suitable materials may include glass or acrylic, for example. To enhance the optical properties of the substrate 42, an anti-reflective coating 43, such as a multilayer coating, is disposed on the lower surface of the substrate 42. A broadband visible anti-reflective coating is typically advantageous.

Figure 8:
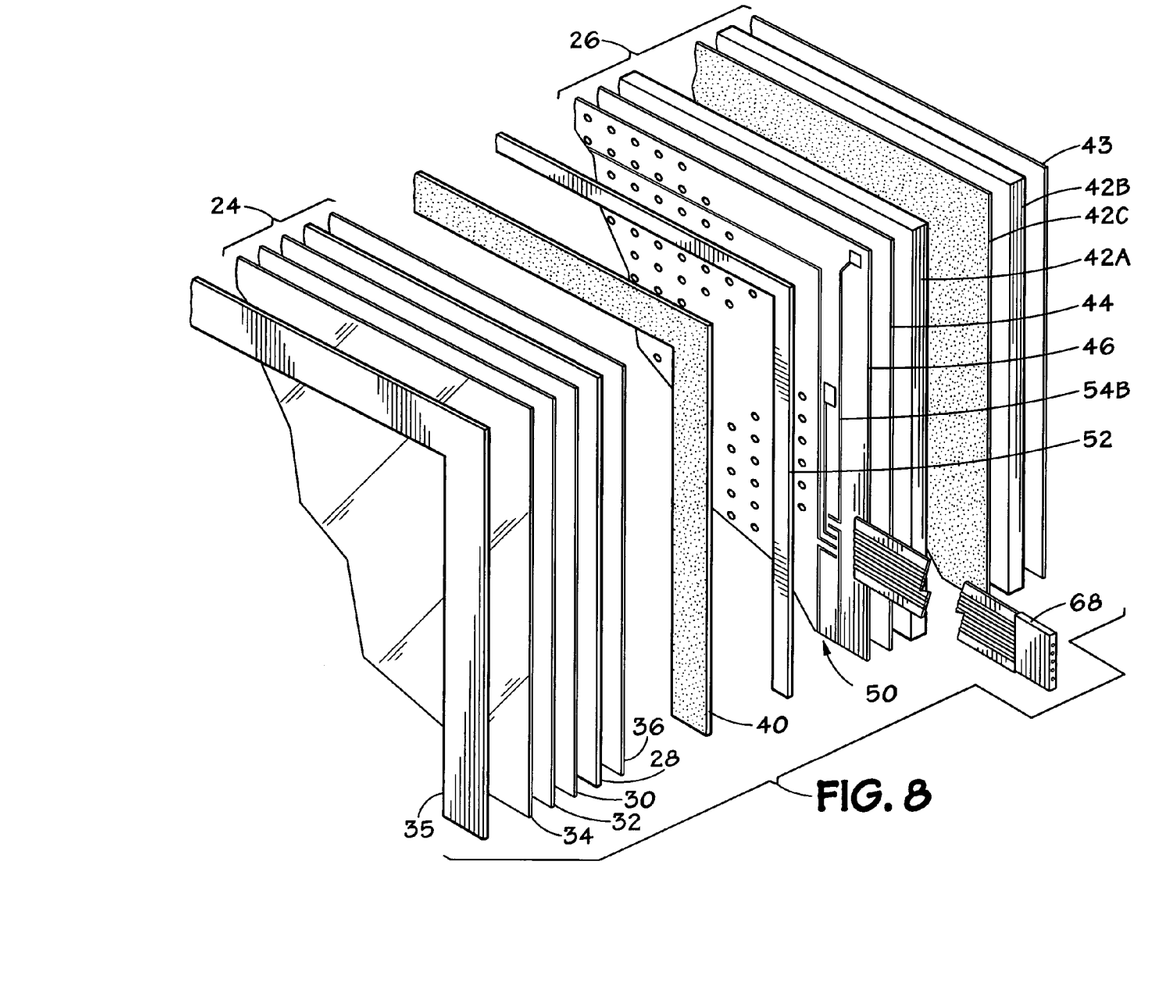
FIG. 8 illustrates a partial exploded view of the touch screen display illustrated in FIG. 2 showing a detailed view of the substrate of the base plate.

As illustrated in FIG. 8, the substrate 42 may be fabricated from multiple layers. In this illustration, the substrate 42 includes a first glass portion 42A and a second glass portion 42B coupled together by a sheet adhesive 42C. The second glass portion 42B provides extra support for the touch panel 20 and essentially functions as a "vandal" glass to reduce the likelihood that severe impacts will break the touch panel 20.

A layer of conductive material 44 is disposed on the upper surface of the substrate 42. When a user presses the top plate 24, the conductive material 36 on the underside of the top plate 24 should contact the conductive material 44 on the upper side of the base plate 26. As discussed more fully below, it is the contact between these two layers of conductive material 36 and 44 that completes the resistive voltage divider circuit used to determine the position on the touch screen 20 pressed by the user. However, it is also desirable to reduce the reflection of the base plate 26 as much as possible. While an anti-reflective conductive material, such as the anti-reflective conductive material 36, would improve the optical qualities of the base plate 26, reflection would still be about 8%. Other anti-reflective coatings, such as silicon dioxide or magnesium fluoride, can reduce reflection to about 0.6%, but these coatings are dielectric in nature. As such, the use of these coatings over the layer of conductive material 44 would normally prevent electrical contact between the top plate 24 and the base plate 26.

To address this concern, a patterned anti-reflective dielectric layer 46 is disposed over the conductive material 44. As best illustrated by the enlarged view of the patterned anti-reflective dielectric layer 46 depicted in FIG. 9, a plurality of small circular holes 48 is formed in a regular pattern in the layer 46, although other types of holes and patterns may also be suitable. These holes 48 extend through the dielectric layer 46 to expose the underlying conductive layer 44. Thus, when the top plate 24 is pressed by a user, the conductive layer 36 moves into contact with the conductive layer 44 through at least one of the plurality of holes 48 to complete the electrical circuit.

Figure 9:
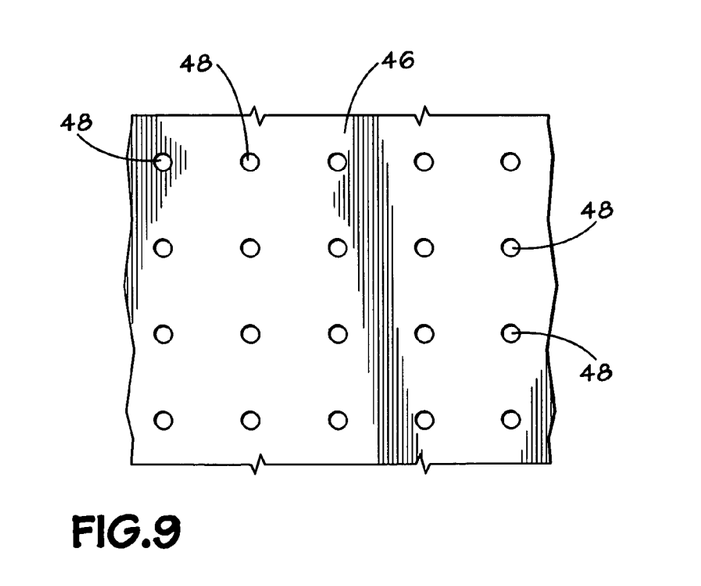
FIG. 9 illustrates a portion of the anti-reflective dielectric layer of the base plate illustrated in FIG. 7.

The holes 48 advantageously are between about 2.5 mil and about 10.0 mil in diameter, and have an average spacing between about 10.0 mil and about 50.0 mil. Values may be selected so that between about 1.0% and about 5.0% of the surface of the underlying conductive layer 44 is exposed. In one particularly advantageous embodiment, the holes 48 have a diameter of about 3.0 mils and an average spacing of about 20.0 mils, so that about 1.75% of the underlying conductive layer 44 is exposed as very small dots. In this embodiment, the dot array combined with the low reflectivity properties of the dielectric material used in the layer 46 yields an average reflectivity of about 1%.

The patterned anti-reflective dielectric layer 46 may be formed in any suitable manner. For example, a dielectric material, such as silicon dioxide, may be deposited in a layer over the conductive layer 44. Then, using photoresist patterning and etching techniques, the holes 48 may be patterned and etched. Alternatively, a photoresist process may be used to deposit a dielectric material, such as magnesium fluoride, onto the conductive layer 44 in its patterned form.

It should be understood that spacer dots (not shown), which are small insulative protrusions often used to separate opposing conductive surfaces between a top plate and base plate of a touch screen, may be used in the touch screen 20. However, as an additional advantage, the use of a mostly insulated upper surface of the base plate 26 may reduce or eliminate the usage of spacer dots. The reduction or elimination of spacer dots serves two useful ends. First, the cost should be reduced since the spacer dots are not manufactured. Second, spacer dots tend to reflect light passing through a touch screen, so the reduction or elimination of the spacer dots correspondingly reduces or eliminates this reflected light which adversely affects the optical qualities of a touch screen.

The use of the dielectric layer 46 may also facilitate the incorporation of other improvements into the touch screen 20. For example, as illustrated in FIGS. 6 and 7, a resistive voltage divider circuit 50 may be fabricated about a peripheral portion of the base plate 26. Conventionally, a discrete voltage divider is implemented about the edges of the upper conductive layer of the base plate using a small segment of the sheet resistance of the conductive surface. Disadvantageously, however, such a construction provides a number of fixed voltages, so linearity is adversely affected. To address this concern, the resistive voltage divider circuit 50 includes a thick film resistive trace 52. The trace 52 is disposed on the conductive layer 44 and extends substantially continuously about the outer periphery of the dielectric layer 46. Also, to improve linearity further, the trace 52 may be tapered toward the corners to increase resistance gradually along each of the sides of the trace 52. It should be noted that the layer 46 and the trace 52 are illustrated with diagonal lines for contrast only—no crosshatching or diagonal lines are actually present on these elements.

Four conductive traces 54A, 54B, 54C, and 54D are disposed along a peripheral portion 56 of the dielectric layer 46. Advantageously, this peripheral portion 56 of the dielectric layer 46 contains no holes 48 and, thus, insulates the conductive traces 54A-54D from the conductive layer 44. One end of each of the conductive traces 54A, 54B, 54C, and 54D is coupled to a respective corner 58A, 58B, 58C, and 58D of the resistive trace 52. The other end of each of the conductive traces 54A, 54B, 54C, and 54D is coupled to a respective conductive termination pad 60A, 60B, 60C, and 60D located on one side of the peripheral portion 56 of the dielectric layer 46.

A conductive voltage divider trace 62 is also located on this side of the peripheral portion 56 of the dielectric layer 46. One end of the voltage divider trace 62 is coupled to a small conductive termination pad 64 disposed amongst the termination pads 60A, 60B, 60C, and 60D, and the other end of the voltage divider trace 62 is coupled to a larger conductive termination pad 66. As best illustrated in FIG. 6, the conductors of an interface cable 68 may be coupled to the pads 60A, 60B, 60C, 60D, 64, and 66 to provide appropriate electrical signals to the controller 14. Advantageously, the pad 66 has a resilient conductive surface to make contact with top plate 24 when it is in place, but also allows top plate 24 to be removed. For example, a conductive RTV (room temperature vulcanizing) silicone filled with copper, nickel or silver may be used.

The traces and termination pads mentioned above may be fabricated in any suitable manner. For example, these traces and pads may be fabricated from films deposited by a silk screening technique or the like. Alternatively, photoresist patterning and etching techniques may by used to form these traces and pads.

In view of the specific embodiments disclosed and discussed above, it should be appreciated that the touch panel 20 incorporates several advantageous features that may be useful individually or in combination. As to one advantage, the touch panel 20 exhibits excellent optical properties due to the arrangement of anti-reflective layers on the four surfaces of the touch panel 20 that are adjacent the air. As to another advantage, the top plate 24 of the touch panel 20 may be removed when damaged and replaced without replacing any of the other elements of the system 10. Yet another advantage stems from the use of the patterned anti-reflective dielectric layer 46 on the base plate 26 to improve optical properties while still facilitating electrical contact between the top plate 24 and the base plate 26. The use of this layer 46 may further improve the optical properties of the touch panel 20 due to the reduction or elimination of spacer dots. Of course, the touch panel 20 also includes the resistive voltage divider circuit 50 which improves the linearity of the voltage sensing function of the touch panel 20 and, thus, improves the touch point density and accuracy.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A touch panel display system comprising:
   a computer;
   a controller coupled to the computer;
   a display screen coupled to the computer;
   a touch panel coupled to the controller and being disposed over the display screen, the touch panel comprising:
   a base plate being disposed adjacent the display screen, the base plate having a rigid substrate having an upper surface and a lower surface, a first conductive layer disposed over the upper surface of the rigid substrate, an anti-reflective dielectric layer disposed over the first conductive layer, the anti-reflective dielectric layer having openings through to the first conductive layer, and a first anti-reflective layer disposed on the lower surface of the rigid substrate; and
   a top plate being disposed in spaced apart relation over the base plate, the top plate having a flexible substrate having an upper surface and a lower surface, a hard coating layer, a second anti-reflective layer, and a tensioning frame disposed over the upper surface of the flexible substrate, and an anti-reflective conductive layer disposed on the lower surface of the flexible substrate.

2. The system, as set forth in claim 1, wherein the display screen comprises a liquid crystal display.

3. The system, as set forth in claim 1, wherein the top plate is removably mounted in spaced apart relation over the base plate.

4. The system, as set forth in claim 3, comprising double stick adhesive tape coupling the top plate to the base plate.

5. The system, as set forth in claim 4, wherein the double stick adhesive tape comprises a relatively high tack adhesive side and a relatively low tack adhesive side.

6. The system, as set forth in claim 5, wherein the relatively high tack adhesive side is coupled to the top plate and the relatively low tack adhesive side is coupled to the base plate.

7. The system, as set forth in claim 5, wherein the relatively high tack adhesive side is coupled to the base plate and the relatively low tack adhesive side is coupled to the top plate.

8. The system, as set forth in claim 1, wherein the second anti-reflective layer is disposed over the hard coating layer.

9. The system, as set forth in claim 1, wherein the top plate comprises an anti-fingerprint layer disposed over the second anti-reflective layer and the hard coating layer.

10. The system, as set forth in claim 1, wherein the anti-fingerprint layer comprises a hydrophobic material.

11. The system, as set forth in claim 1, wherein a-the tensioning frame comprises the reinforced material.

12. The system, as set forth in claim 1, wherein the tensioning frame comprises a metal.

13. The system, as set forth in claim 12, wherein the tensioning frame comprises one of aluminum and stainless steel.

14. The system, as set forth in claim 1, wherein the tensioning frame is bonded to an outer surface of the top plate.

15. The system, as set forth in claim 14, wherein the tensioning frame is bonded to an outer surface of the top plate with a UV curing adhesive.

16. The system, as set forth in claim 1, wherein the rigid substrate comprises glass.

17. The system, as set forth in claim 1, wherein the rigid substrate comprises a first substrate portion bonded to a second substrate portion.

18. The system, as set fort in claim 17, wherein the first substrate portion and the second substrate portion comprise glass.

19. The system, as set forth in claim 1, comprising a coating which reflects solar energy outside the visible spectrum disposed on at least one of the top plate and the base plate.

20. The system, as set forth in claim 19, wherein the coating which reflects solar energy comprises a hot mirror capability.

21. The system, as set forth in claim 1, wherein the first conductive layer comprises at least one of titanium and indium tin oxide.

22. The system, as set forth in claim 1, wherein the anti-reflective dielectric layer comprises at least one of silicon dioxide and magnesium fluoride.

23. The system, as set forth in claim 1, wherein each opening has an area in a range from about 2.5 mils to about 10.0 mils, and wherein the openings have an average spacing in a range from about 10.0 mils to about 50.0 mils.

24. The system, as set forth in claim 1, wherein the first anti-reflective layer comprises multiple layers.

25. The system, as set forth in claim 1, wherein the flexible substrate comprises one of Mylar, Lexan, and CR-39.

26. The system, as set forth in claim 1, wherein the hard coating layer comprises silicon dioxide.

27. The system, as set forth in claim 1, wherein the second anti-reflective layer comprises at least one of silicon dioxide and magnesium fluoride.

28. The system, as set forth in claim 1, wherein the anti-reflective conductive layer comprises at least one of titanium and indium tin oxide.

29. The system, as set forth in claim 1, wherein the touch panel comprises a sensing circuit coupled to the first conductive layer and to the anti-reflective conductive layer, the sensing circuit delivering a signal correlative to a position where the first conductive layer contacts the anti-reflective conductive layer.

30. The system as set forth in claim 29, wherein the sensing circuit comprises:
   a substantially continuous resistive member disposed on the first conductive layer adjacent a peripheral portion of the anti-reflective dielectric layer; and
   a plurality of conductive traces disposed on the anti-reflective dielectric layer, each of the plurality of conductive traces having a first end coupled to a respective selected location of the resistive member and having a second end coupled to the controller.

* * * * *